(12) United States Patent
Kim (10) Patent No.: US 12,392,908 B2
(45) Date of Patent: Aug. 19, 2025

(54) METHOD AND DEVICE FOR CORRECTING GRADIENT OFFSET OF MOVING OBJECT

(71) Applicants: Hyundai Motor Company, Seoul (KR); Kia Corporation, Seoul (KR)

(72) Inventor: Young Kwang Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 358 days.

(21) Appl. No.: 17/974,099

(22) Filed: Oct. 26, 2022

(65) Prior Publication Data

US 2023/0350080 A1 Nov. 2, 2023

(30) Foreign Application Priority Data

May 2, 2022 (KR) .................. 10-2022-0053962

(51) Int. Cl.
*G01S 19/40* (2010.01)
*G01S 19/45* (2010.01)
*G01S 19/52* (2010.01)
*G01C 21/16* (2006.01)
*G01S 19/53* (2010.01)

(52) U.S. Cl.
CPC .............. *G01S 19/40* (2013.01); *G01S 19/45* (2013.01); *G01S 19/52* (2013.01); *G01C 21/165* (2013.01); *G01S 19/53* (2013.01)

(58) Field of Classification Search
CPC .......... G01S 19/40; G01S 19/45; G01S 19/52; G01S 19/53; G01C 21/165
USPC ............. 342/357.23, 357.28, 357.35, 357.36
See application file for complete search history.

(56) References Cited

U.S. PATENT DOCUMENTS

| | | | | |
|---|---|---|---|---|
| 6,668,236 B1 * | 12/2003 | Braghiroli | ............... | G01B 21/26 702/104 |
| 8,532,899 B1 * | 9/2013 | Loomis | .................... | G01C 9/08 702/96 |
| 8,566,034 B1 * | 10/2013 | Van Wyck Loomis | .. | G01C 5/00 702/96 |
| 8,948,924 B2 * | 2/2015 | Lee | ......................... | B60T 8/172 701/1 |
| 2023/0067558 A1 * | 3/2023 | Abe | ....................... | G06F 16/29 |

FOREIGN PATENT DOCUMENTS

| | | | | | |
|---|---|---|---|---|---|
| CN | 114655224 A | * | 6/2022 | ......... | B60W 40/076 |
| CN | 117246342 A | * | 12/2023 | ......... | B60W 40/076 |
| CN | 117516589 A | * | 2/2024 | ............. | G01C 25/00 |
| JP | 2001082956 A | * | 3/2001 | ............. | F16H 59/66 |
| JP | 2004045423 A | * | 2/2004 | ............. | F16H 59/66 |
| JP | 2022190463 A | * | 12/2022 | ............... | G01C 9/08 |

* cited by examiner

*Primary Examiner* — Chuong P Nguyen
(74) *Attorney, Agent, or Firm* — Fish & Richardson P.C.

(57) ABSTRACT

Disclosed herein a method and device for correcting gradient offset of moving object. The method includes: obtaining moving object velocity data based on a positioning sensor obtained during driving of the moving object; calculating a gradient offset observation value based on the moving object velocity data; calculating gradient offset estimation data based on the gradient offset observation value; and changing an inclinometer offset value stored in the moving object to the gradient offset observation value, in response to the gradient offset estimation data and the gradient offset observation value satisfying an offset correction condition.

20 Claims, 4 Drawing Sheets

METHOD AND DEVICE FOR CORRECTING GRADIENT OFFSET OF MOVING OBJECT

CROSS REFERENCE TO RELATED APPLICATION

The present application claims priority to a Korean application 10-2022-0053962, filed May 2, 2022, the entire contents of which are incorporated herein for all purposes by this reference.

TECHNICAL FIELD

The present disclosure relates to a method and device for correcting a gradient offset of a moving object, and, more particularly, to a method and device for correcting a gradient offset of a moving object, which is capable of automatically adjusting a zero point of an inclinometer without mounting an additional module.

BACKGROUND

A moving object running on the ground is equipped with various types of sensors for detecting the internal state and an external environment of the moving object. Among these sensors, an inclinometer (hereinafter, used interchangeably with an inclination sensor) detects and calculates an inclination angle of the moving object according to the state of the road surface on which the moving object is traveling, and may be managed by a controller such as a vehicle control unit (VCU). Zero point information as a reference for calculating the inclination angle using the inclinometer is essential, and zero point information referred to as an offset value of the inclinometer may be stored in a memory, for example, a non-volatile memory, of the moving object.

The zero point information may be adjusted according to periodic maintenance or circumstances. Conventional zero point adjustment may be a method of using a diagnostic device for performing zero point adjustment after an engineer stops the moving object on the flat ground. Specifically, the engineer inputs a zero point adjustment command to the diagnostic device and the controller managing the inclinometer stores, in the memory, a signal value (or a signal value; zero point) of the current inclinometer according to the command, thereby adjusting the zero point. However, when zero point readjustment is omitted after replacing the inclinometer or the controller or zero point adjustment is performed on the uneven ground, the conventional adjustment method causes problems.

Due to the above-described problems, previously stored zero point information may contain error which is not suitable for the current state. The zero point information of the inclinometer having the error may cause malfunction or error of the functions of the moving object. Functions affected by erroneous zero point information may include, for example, easy hill start (EHS), a weight estimation function, etc. The EHS may be a function for preventing a moving object from being pushed backward by gravity when starting on an upward gradient. When the moving object is powered by a hydrogen-based fuel cell system, the weight estimation function may be a function necessary to optimize fuel efficiency such as adaptive control of the amount of generated power of the fuel cell based on weight estimation of the moving object.

When error occurs due to failure in zero point adjustment of the inclinometer, the following malfunction may be caused in the EHS and the weight estimation function. In case of EHS operation on the flat ground, the moving object may not start when an accelerator pedal whose pressing depth is checked through an accelerator positioning sensor (APS) is not pushed to a certain depth. In addition, an accident may be caused in a situation in which precise control of the moving object such as parking situation is necessary. Side effects of weight estimation due to erroneous zero point may include poor SOC management of a battery and driving function derivation due to underestimation or overestimation of the amount of generated power necessary for the fuel cell.

Accordingly, a method of measuring or calculating the gradient of the moving object based on a positioning sensor such as a GPS sensor without mounting an inclinometer in the moving object may be considered, but it is difficult to measure the gradient due to the following problems. Reliability of measurement of the gradient based on the positioning sensor is obtained only when it is measured after a considerable velocity. In addition, when the moving object travels in a shadow area such as a tunnel or an underground parking lot, the positioning sensor cannot measure a current position and altitude. Since the positioning sensor can efficiently determine or converge the position only when a predetermined time has elapsed after start-up, the positioning sensor data immediately after start-up cannot be used. Furthermore, when the moving object starts in a stopped state, accuracy of the positioning sensor is very low.

Accordingly, since the gradient cannot be measured by only the data of the positioning sensor and is obtained depending on the inclinometer, there is a need for a method of more easily performing zero point adjustment of the inclinometer, that is, correction of a gradient offset value.

SUMMARY

An object of the present disclosure is to provide a method and device for correcting a gradient offset of a moving object, which is capable of automatically adjusting a zero point of an inclinometer without mounting an additional module.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, there is provided a method of correcting a gradient offset of a moving object, the method comprising: obtaining moving object velocity data based on a positioning sensor obtained during driving of the moving object; calculating a gradient offset observation value based on the moving object velocity data; calculating gradient offset estimation data based on the gradient offset observation value; and changing an inclinometer offset value stored in the moving object to the gradient offset observation value, in response to the gradient offset estimation data and the gradient offset observation value satisfying an offset correction condition.

According to the implementation of the present disclosure in the method, the method may further include determining matching of the positioning sensor, before the calculating of the gradient offset observation value. The calculating the gradient offset observation value may be performed in response to satisfying the matching.

According to the implementation of the present disclosure in the method, the matching may be satisfied by satisfying both an observation matching condition and a velocity matching condition. The observation matching condition may be set such that the number of satellites observable in relation to the positioning sensor is greater than the number of satellites used for the matching. Also, the velocity matching condition may be set such that a wheel based velocity of the moving object is greater than or equal to a matching velocity and relative error between the moving object velocity data and the wheel based velocity is less than or equal to a matching threshold.

According to the implementation of the present disclosure in the method, the gradient offset observation value may be calculated based on a difference between a gradient based on the positioning sensor and a gradient of the inclinometer calculated on the assumption that an inclinometer offset value is 0. Also, the gradient based on the positioning sensor may be calculated based on the moving object velocity data, and the moving object velocity data includes a magnitude of a velocity vector based on the positioning sensor and a vertical velocity in the velocity vector.

According to the implementation of the present disclosure in the method, the gradient of the inclinometer may be calculated based on the wheel based velocity of the moving object, a measurement value of the inclinometer provided in the moving object and a yaw rate of the moving object.

According to the implementation of the present disclosure in the method, the calculating the gradient offset estimation data may include estimating the gradient offset estimation data using recursive least squares (RLS). The estimation according to the recursive least squares may employ, as input parameters, at least a newest gradient offset observation value among the gradient offset observation values calculated during driving and at least a past offset estimation covariance among offset estimation covariances based on the positioning sensor calculated during driving. Also, the gradient offset estimation data may include a positioning sensor based gradient offset estimation value and a newest offset estimation covariance.

According to the implementation of the present disclosure in the method, the estimation according to the recursive least squares may be performed by adding a forgetting factor. Also, a gradient offset observation value used for the estimation among current to past gradient offset observation values may be determined according to a value of the forgetting factor.

According to the implementation of the present disclosure in the method, the estimation according to the recursive least squares may include calculating the gradient offset estimation data in response to satisfying matching of the positioning sensor.

According to the implementation of the present disclosure in the method, the offset correction condition may be set such that some data of the gradient offset estimation data is less than or equal to a convergence reference value and gradient error between the stored inclinometer offset value and the gradient offset observation value is greater than or equal to a detection reference value. Also, the some data may be an positioning sensor based-offset estimation covariance during driving.

According to the implementation of the present disclosure in the method, the method may further include calculating a gradient according to the inclinometer by applying the changed inclinometer offset value, during driving, and storing the changed inclinometer offset value in a memory of the moving object, in response to elapse of a holding time after start-up of the moving object is turned off.

According to the present disclosure, there is provided a device for correcting a gradient offset of a moving object, the device comprising: a memory configured to store at least one instruction and an inclinometer offset value; and a processor configured to execute the at least one instruction stored in the memory. The processor is configured to: obtain moving object velocity data based on a positioning sensor obtained during driving of the moving object, calculate a gradient offset observation value based on the moving object velocity data, calculate gradient offset estimation data based on the gradient offset observation value, and change the inclinometer offset value stored in the moving object to the gradient offset observation value, in response to the gradient offset estimation data and the gradient offset observation value satisfying an offset correction condition.

The features briefly summarized above for this disclosure are only exemplary aspects of the detailed description of the disclosure which follow, and are not intended to limit the scope of the disclosure.

According to the present disclosure, it is possible to provide a method and device for correcting a gradient offset of a moving object, which is capable of automatically adjusting a zero point of an inclinometer without mounting an additional module According to the present disclosure, it is possible to automatically perform zero point adjustment necessary for an inclinometer of a moving object using information obtained from a positioning sensor provided in the moving object without mounting a separate sensor.

According to the present disclosure, it is possible to prevent malfunction of easy hill start (EHS) and error of weight estimation by automatic zero point adjustment.

According to the present disclosure, it is possible to automatically realize a gradient offset, that is, zero point adjustment using information on a positioning sensor obtained during driving, when response characteristics are changed due to aging of the inclinometer or when zero point adjustment is omitted in a maintenance process after replacing an inclinometer or a controller (e.g., a vehicle control unit (VCU)) for controlling the inclinometer.

It will be appreciated by persons skilled in the art that that the effects that can be achieved through the present disclosure are not limited to what has been particularly described hereinabove and other advantages of the present disclosure will be more clearly understood from the detailed description.

DETAILED DESCRIPTION

Hereinafter, exemplary implementations of the present disclosure will be described in detail with reference to the accompanying drawings so that those skilled in the art may easily implement the present disclosure. However, the present disclosure may be implemented in various different ways, and is not limited to the implementations described therein.

In describing exemplary implementations of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an implementation could be termed a second element in another implementation, and, similarly, a second element in an implementation could be termed a first element in another implementation, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed implementations are included in the scope of the present disclosure.

In the present disclosure, elements described in various implementations do not necessarily mean essential elements, and some of them may be optional elements. Therefore, an implementation composed of a subset of elements described in an implementation is also included in the scope of the present disclosure. In addition, implementations including other elements in addition to the elements described in the various implementations are also included in the scope of the present disclosure.

The advantages and features of the present disclosure and the way of attaining them will become apparent with reference to implementations described below in detail in conjunction with the accompanying drawings. Implementations, however, may be embodied in many different forms and should not be construed as being limited to example implementations set forth herein. Rather, these implementations are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", "at least one of A, B or C" and "at least one of A, B, C or combination thereof" may include any one or all possible combinations of the items listed together in the corresponding one of the phrases.

Hereinafter, implementations of the present disclosure will be described with reference to the accompanying drawings.

Figure 1:
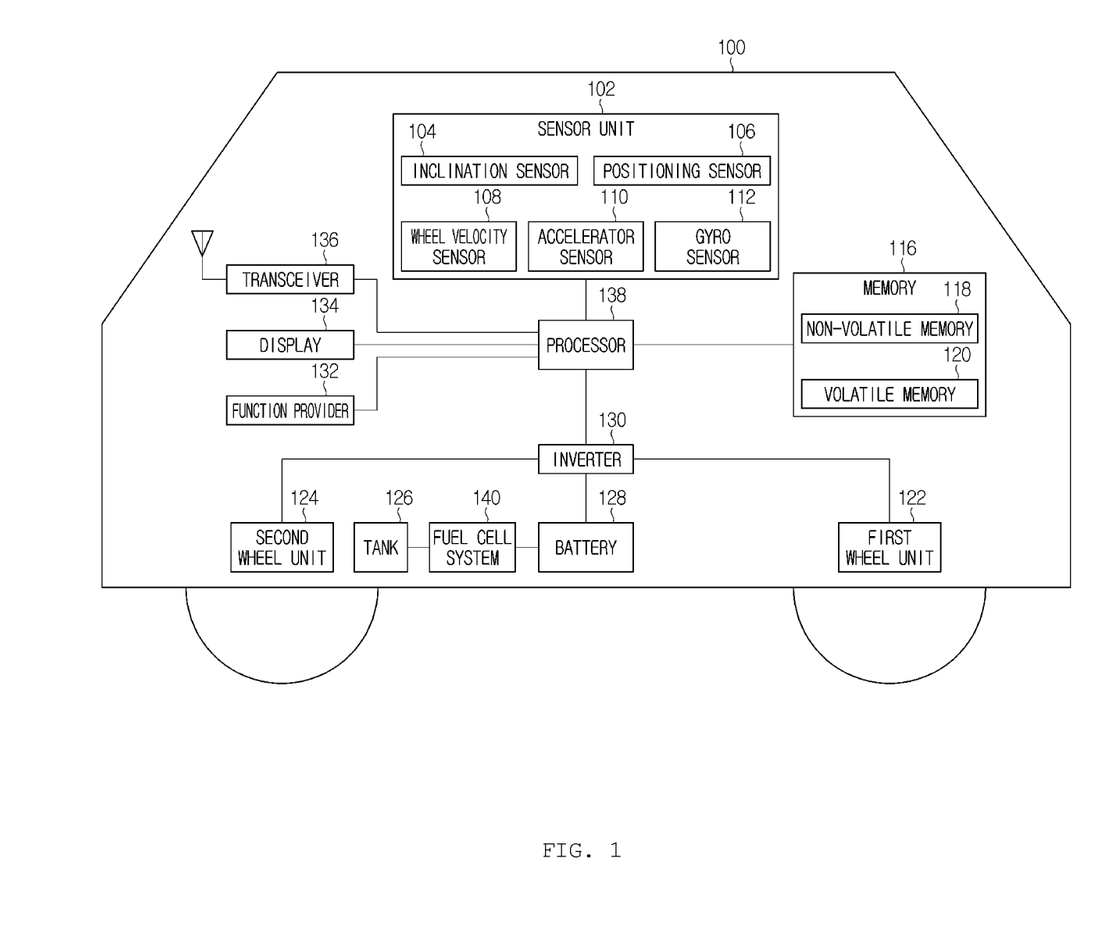
FIG. 1 is a block diagram illustrating configuration modules of a moving object including a gradient offset correction device according to an implementation of the present disclosure.

FIG. 1 is a block diagram illustrating configuration modules of a moving object including a gradient offset correction device according to an implementation of the present disclosure.

A moving object 100 may be powered by electrical or fossil energy. Specifically, the moving object 100 may employ a directly charged electric battery or a gas-based fuel cell as an energy source. In case of a fuel cell, the moving object 100 may use various types of gases capable of generating electrical energy in the fuel cell and the gas may be, for example, hydrogen. However, the disclosure is not limited thereto and various gases are applicable. As another example, the moving object 100 may employ fossil fuel such as gasoline or diesel as an energy source. In the present disclosure, although the moving object 100 based on the electrical energy shown in FIG. 1 is described as an example, the implementation according to the present disclosure is applicable to a fossil energy based moving object.

The moving object 100 may refer to, for example, a movable device. The moving object 100 may be a general passenger or commercial vehicle, a mobile office or a mobile hotel. The vehicle may be a four-wheeled vehicle, such as a passenger vehicle, SUV, light truck and vehicles having more than four wheels may be, for example, a large truck, a container carrying vehicle, a heavy vehicle, etc. The moving object 100 may be implemented with manned driving or autonomous driving (including semi-autonomous and fully autonomous driving).

Meanwhile, the moving object 100 may perform communication with another device or another moving object. In this case, for example, the moving object may perform communication with another device based on cellular communication, WAVE communication, DSRC (Dedicated Short Range Communication) or the other communication method. That is, as a cellular communication network, a communication network such as LTE or 5G, a Wi-Fi communication network, a WAVE communication network, etc. may be used. In addition, a short-range communication network used in the moving object, such as DSRC, may be used, and the disclosure is not limited to the above-described implementation.

Specifically, the moving object 100 may include a sensor unit 102, a memory 116, a first wheel unit 122, a second wheel unit 124, a function provider 132, a display 134, a transceiver 136 and a processor 138.

The sensor unit 102 may include various types of sensor modules for detecting various states or situations occurring in internal and external environments of the vehicle. The sensor unit 102 may include, for example, an inclination sensor 104 for measuring an inclination angle of the moving object 100 with respect to the ground on which the moving object is stopped or driven, a positioning sensor 106 for measuring positioning of the moving object 100, a wheel velocity sensor 108 for measuring a wheel based velocity, an accelerator sensor 110 for detecting an acceleration of the moving object 100 and a gyro sensor 112 for detecting a posture and direction of the moving object 100. In addition, the sensor unit 102 may include an image sensor for providing the inside and outside of the vehicle as visual images, a Lidar, a radar sensor, a distance sensor, etc. In the present disclosure, sensors referenced in the description of the implementation will be focused upon, but sensors for detecting various situations, which are not listed herein, may be further included.

The inclination sensor 104 may include modules for measuring the inclination angle of the moving object 100 with respect to the ground on which the moving object is stopped or driven, and operation modules for calculating the inclination angle. The inclination sensor 104 may calculate the inclination angle by referring to an inclinometer offset value stored in the memory 116. The inclinometer offset value may be, for example, a signal value corresponding to the zero point of the inclinometer. The inclinometer offset value may be changed according to maintenance or circumstances, and the inclination sensor 104 may calculate the inclination angle by applying the changed inclinometer offset value. For example, an engineer may connect a diagnostic device capable of inputting a zero point adjustment command to the processor 138 of the moving object 100, for example, the VCU, and use the zero point adjusted according to the command as the inclinometer offset value. In addition, as in the present disclosure, the inclinometer offset value changed using data based on the positioning sensor 106 may be used as a zero point. In the present disclosure, the inclination sensor 104 has substantially the same meaning as an inclinometer and, hereinafter, will be used interchangeably with the inclinometer.

The positioning sensor 106 may measure the two-dimensional position and altitude of the moving object 100 which is stopped or being driven. The positioning sensor 106 may be, for example, a GPS sensor, and the GPS sensor may measure positioning of the moving object 100 based on information transmitted from a plurality of satellites. The positioning sensor 106 is not limited to the GPS sensor and may include multiple sensors combined with other sensors including the GPS sensor.

The wheel velocity sensor 108 may measure a wheel velocity based on rotation of at least one wheel provided in the first and second wheel units 122 and 124. The wheel velocity sensor may be coupled with a power transmission/driving/braking system, such as an electric braking system (EBS) and/or a transmission control unit (TCU), in order to detect wheel rotation.

The accelerator sensor 110 may measure not only the traveling direction of the moving object 100 but also an acceleration in a direction different from the traveling direction. The gyro sensor 112 may function as a posture/orientation sensor for detecting the posture of the vehicle including yaw of the moving object 100.

The memory 116 may store an application and various data for control of the moving object 100 and load the application or read and write data by the request of the processor 138.

The memory 116 may include a non-volatile memory 118 and a volatile memory 120. The non-volatile memory 118 may continuously store and manage an application and data regardless of start-up and power on/off, unless it is intended. The volatile memory 120 may temporarily store data such that data is deleted when start-up and/or power of the moving object 100 is turned off.

In the present disclosure, the non-volatile memory 118 may store an application and at least one instruction for correcting the inclinometer offset value based on data from the positioning sensor 106, and the processor 138 may be configured to execute the application and instruction stored in the memory 116. In addition, the non-volatile memory 118 may replace and maintain an updated change value while storing the inclinometer offset value used to measure the inclination angle of the inclination sensor 104.

The moving object 100 may include an inverter 130 for converting a specific form of power of the battery 128 into another form and reducing a voltage and at least one first and second wheel units 122 and 124 powered by receiving power from the inverter 130. The first and second wheel units 122 and 124 may be configured to include a power transmission system in addition to wheels and a motor. When at least one of the first and second wheel units 122 and 124 is a driving wheel, a motor for transmitting driving force to the wheel, a motor control module for controlling motor torque, a motion rotation direction, braking, etc. may be provided.

The motor provided in the wheel unit may be powered by receiving power from the battery 128 through the inverter 130. In case of the fuel cell, the battery 128 may be charged by electric power generated by a fuel cell system 140. The fuel cell system 140 may include a hydrogen fuel cell including a plurality of stacks for generating electric energy through a reaction between hydrogen supplied from a tank 126 and oxygen supplied from the outside. The battery 128 may provide the electric energy generated by charging the fuel cell system 140 to the driving, lighting, air conditioning and various electrical devices of the moving object 100. The battery 128 may include a first battery for supplying energy to a driving wheel and a high-power electric equipment and a second battery for supplying energy to a low-power electric equipment and charging the first battery. Here, the second battery may be composed of a hydrogen fuel cell. The inverter 130 may convert a specific form of power of the battery 128, such as direct current, into another form, such as alternating current, and reduce a voltage. In case of electric moving object using directly charged electric battery, the tank 126 and the fuel cell system 140 may be omitted in FIG. 1 and the battery 128 may obtain electric power through an external charger.

The function provider 132 may have a functional module for various control of the moving object 100 and convenience of a passenger. The processor 138 or a functional module according to the request of the passenger may be activated and the function may be implemented by support of the processor 138 and the memory 116. For example, the moving object 100 may include an EHS, a weight estimation function, map information transmitted from the outside, and a route guidance function based on data of the positioning sensor 106. The EHS may be, for example, a function for preventing a moving object 100 from being pushed backward by gravity when starting on an upward gradient. The weight estimation function may be a function necessary to optimize fuel efficiency such as adaptive control of the amount of generated power of the fuel cell based on weight estimation of the moving object 100. When the EHS and the weight estimation function are implemented, the function provider 132 may implement the above functions using the inclination angle measured by the inclination sensor 104. Here, the inclination angle may be stored in the non-volatile memory 118 or may be measured by referring to the inclinometer offset value changed based on the data of the positioning sensor 106 during driving.

The display 134 may function as a user interface. The display 134 may perform display to output, by the processor 138, operation state, control state, route/traffic information, battery state, gas remaining amount information, content requested by a user, etc. of the moving object 100. The display 134 includes a touchscreen capable of detecting user input and receive a user's request from the processor 138.

The transceiver 136 may support mutual communication with a moving object around a vehicle, a traffic intelligence service server, a roadside base station, a server or edge device for providing various vehicle services.

The processor 138 may perform overall control of the moving object 100. The processor 138 may include at least one processing module, and a function related to each control may be implemented in one processing module or a corresponding processing module of a plurality of modules. In relation to the present disclosure, the processor 138 may control the moving object 100 to correct the inclinometer offset value using the application, instruction and data stored in the memory 116.

Specifically, the processor 138 may obtain moving object velocity data based on the positioning sensor 106 obtained during driving of the moving object 100, and calculate a gradient offset observation value based on the moving object velocity data. In addition, the processor 138 may calculate gradient offset estimation data based on the gradient offset observation value. In addition, the processor 138 may change the inclinometer offset value stored in the moving object 100 to a gradient offset observation value, when the gradient offset estimation data and the gradient offset observation value satisfy an offset correction condition.

According to the gradient offset correction device according to the present disclosure may include at least the inclination sensor 104, the positioning sensor 106, the wheel velocity sensor 108, the non-volatile memory 118 and the processor 138, and may be configured to implement a process of correcting the gradient offset value by the processor 138. The process may be performed in at least a part of the processor 138, for example, at least one processing module and at least a part of the memory 116, and the processor 138 and the memory 116 related to the process may function as a VCU, for example. The process of the processor 138 will be described in detail with reference to FIGS. 2 to 4.

Figure 2:
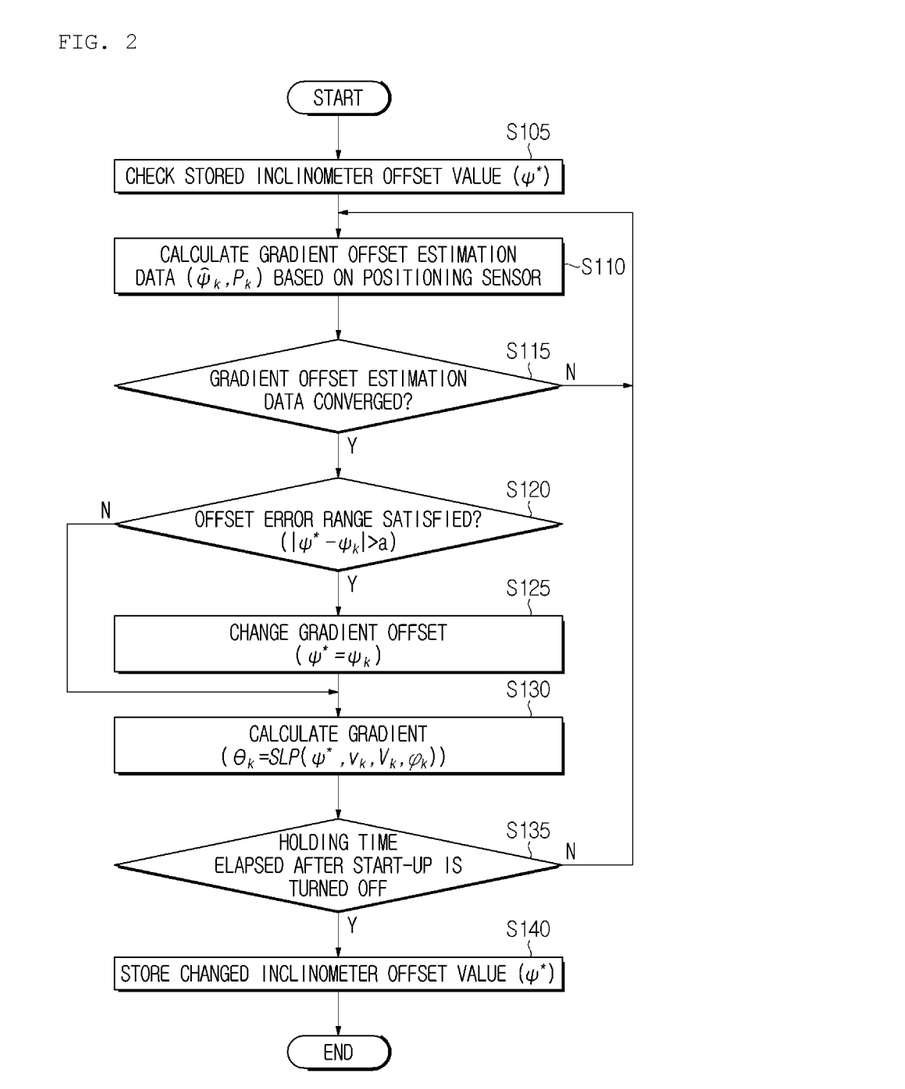
FIG. 2 is a flowchart illustrating a gradient offset correction method of a moving object according to another implementation of the present disclosure.

The gradient offset correction method of the moving object will be described in detail with reference to FIGS. 2 to 4. FIG. 2 is a flowchart illustrating a gradient offset correction method of a moving object according to another implementation of the present disclosure.

First, the processor 138 may check the inclinometer offset value ψ* stored in the non-volatile memory 118 (S105).

Next, the processor 138 may obtain the moving object velocity data based on the positioning sensor 106 obtained at a predetermined time interval during driving of the moving object 100, and calculate the gradient offset estimation data based on the positioning sensor 106, based on the obtained moving object velocity data (S110).

Step S110 will be described in detail with reference to FIGS. 3 and 4. FIG. 3 is a flowchart illustrating a process of calculating gradient offset estimation data.

Figure 3:
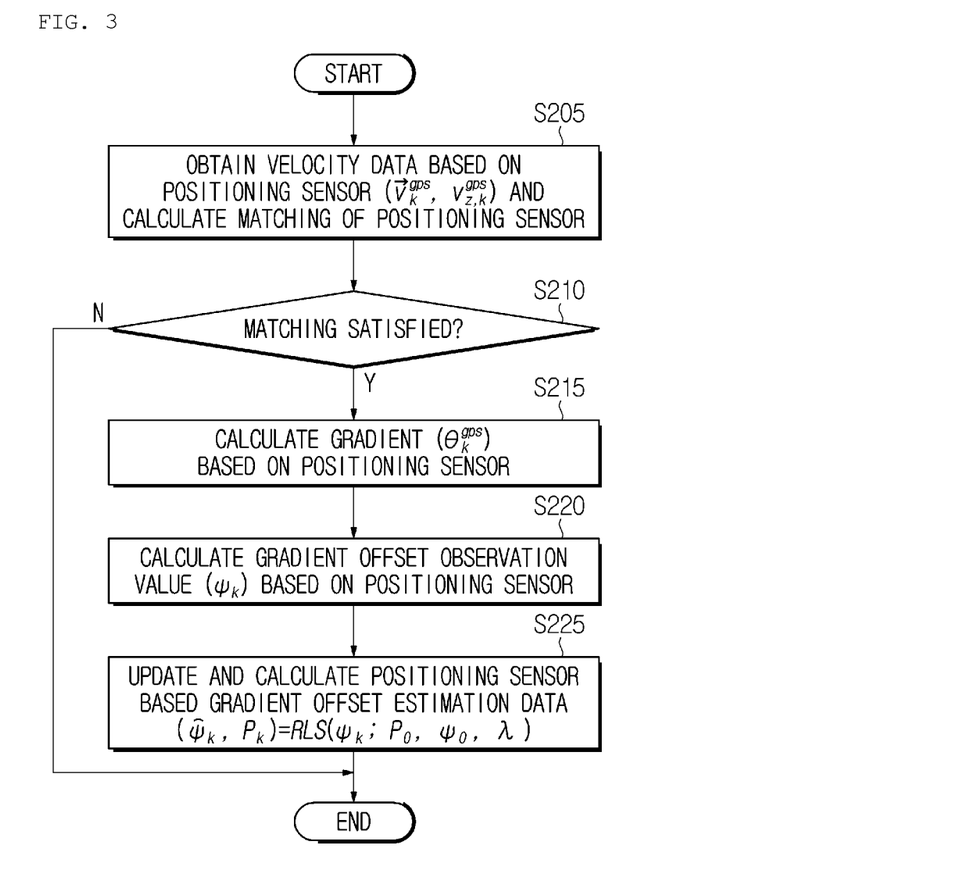
FIG. 3 is a flowchart illustrating a process of calculating gradient offset estimation data.

Referring to FIG. 3, the processor 138 may obtain the moving object velocity data based on the positioning sensor 106 at a predetermined time interval during driving of the moving object 100, obtain a parameter for determining matching of the positioning sensor 106, and generate a result value by calculating a related equation (S205).

The moving object velocity data may include a magnitude $|\vec{v}_k^{gps}|$ of a velocity vector $\vec{v}_k^{gps}$ based on the positioning sensor 106. The processor 138 may calculate a velocity vector based on the two-dimensional position and altitude measured by the positioning sensor 106.

In order to determine the matching, the processor 138 may obtain parameters related to a detailed condition for determining the matching, that is, an observation matching condition and a velocity matching condition, and generate a result value by calculating an equation related to the detailed condition.

The parameters related to the observation matching condition includes the number $N_s$ of satellites observable in relation to the positioning sensor 106 and the number $N_c$ of satellites used for matching, and the processor 138 may request and obtain information on the number from the positioning sensor 106 and the memory 116.

The parameter and equation related to the velocity matching condition may be the wheel based velocity $v_k$ of the moving object 100 measured by the wheel velocity sensor 108, the moving object velocity data based on the positioning sensor 106 and relative error. The relative error may be, for example, Equation 1, and the moving object velocity data may be the magnitude $|\vec{v}_k^{gps}|$ of a velocity vector $\vec{v}_k^{gps}$, as described above.

$$\frac{|\vec{v}_k^{gps}| - v_k}{1 + v_k} \qquad \text{[Equation 1]}$$

Subsequently, the processor 138 may determine whether a result value for determining matching of the positioning sensor 106 satisfies predetermined matching (S210).

The matching may be satisfied when the result value satisfies both the observation matching condition and the velocity matching condition.

The observation matching condition may be set such that the number of observable satellites $N_s$ observable in relation to the positioning sensor 106 is greater than the number $N_c$ used for matching ($N_s > N_c$). The GPS sensor used as the positioning sensor 106 receives a distance from the satellite as a value between [0, $D_{max}$] (e.g., 0 to 1000 km), and the position of the moving object 100 may be determined by a combination of distance information transmitted from receivable satellites. In some cases, when the distance information is cut off by ambiguity and the number of receivable satellites is reduced, accuracy of the position and the moving object velocity data may deteriorate. Satellites used for matching may be provided in the number $N_c$ capable of preventing the deterioration, which may be, for example, 9.

The velocity matching condition may be set such that the wheel based velocity $v_k$ of the moving object 100 measured by the wheel velocity sensor 108 is equal to or greater than a matching velocity and relative error between the moving object velocity data and the wheel based velocity ($v_k$) is less than or equal to a matching threshold.

The matching velocity may be set to a velocity for ensuring validity of data obtained from the positioning sensor 106, and may be determined according to the state of the related module of the moving object 100 and a situation around the moving object 100. As the moving object velocity $|\vec{v}_k^{gps}|$ based on the positioning sensor is lowered, a denominator for calculating the gradient in Equation 4 below is lowered and accuracy of the gradient based on the positioning sensor 106 may decrease. Accordingly, the wheel based velocity $v_k$ substantially equal to the moving object velocity $|\vec{v}_k^{gps}|$ needs to be greater than or equal to a matching velocity. For example, the matching velocity may be 30 km/h, and, when the wheel based velocity satisfies $v_k > 30$ km/h, the velocity matching condition may be satisfied.

In addition, the velocity matching condition according to the relative error may be determined, for example, by Equation 2. Here, the matching threshold may be defined as 0.02. The matching threshold is not limited to the above-described value, and may be experimentally set according to the state of the related module of the moving object 100 and the situation around the moving object 100.

When the relative error satisfies Equation 2, the processor 138 may determine that the moving object velocity based on the positioning sensor 106 is normal and it is a normal driving situation. Therefore, the wheel based velocity and the moving object velocity based on the positioning sensor may be substantially the same.

$$\frac{|\vec{v}_k^{gps}| - v_k}{1 + v_k} \le 0.02 \qquad \text{[Equation 2]}$$

As a result of determination, when the result value does not satisfy at least one of the observation matching condition or the velocity matching condition, the processor 138 may discard information related to the obtained moving object velocity data based on the positioning sensor 106, the wheel based velocity, etc., and perform steps S205 and S210 again using subsequently obtained information.

As a result of determination, when the result value satisfies both conditions, the processor 138 may calculate the gradient based on the positioning sensor 106, based on the moving object velocity data (S215).

The moving object velocity data may include the magnitude $|\vec{v}_k^{gps}|$ of the velocity vector based on the positioning sensor 106 and a vertical velocity $v_{z,k}^{gps}$ in the velocity vector. The velocity vector $\vec{v}_k^{gps}$ may be preprocessed, for example, using a low-pass filter, in order to remove noise. The preprocessing may be performed in step S215 or S205. The vertical velocity $v_{z,k}^{gps}$ may be obtained, for example, by Equation 3, where, $\vec{g}$ may be an average gravity field. The GPS sensor as the positioning sensor 106 may include global geoid earth surface (based on sea level measurement), such as WGS84. The position on the earth's surface is different from a sea level reference surface, but an average gravity field direction $\vec{g}$ is known through the geoid earth surface. Accordingly, when the altitude is sufficiently large, through an inner product with the average gravity field direction $\vec{g}$, the vertical velocity $v_{z,k}^{gps}$ having a positive value may be calculated.

$$v_{z,k}^{gps} = (-\vec{g}) \cdot \vec{v}_k^{gps} \qquad \text{[Equation 3]}$$

In addition, the gradient $\theta_k^{gps}$ may be, for example, calculated by Equation 4 in units of %.

$$\theta_k^{gps} = 100 \times \frac{v_{z,k}^{gps}}{|\vec{v}_k^{gps}|} \qquad \text{[Equation 4]}$$

Subsequently, the processor 138 may calculate a gradient offset observation value based on the positioning sensor 106, based on a difference between the gradient based on the positioning sensor 106 and a gradient in a virgin state (S220).

The gradient $\theta_k^{vir}$ in the virgin state may be the gradient of the inclinometer 104 calculated on the assumption that the inclinometer offset value is 0. The gradient in the virgin state may be a dedicated logic provided to estimate the gradient offset based on the positioning sensor. The gradient in the virgin state may be calculated, for example, based on the wheel based velocity $v_k$ of the moving object 100, a measurement value $V_k$ measured by the accelerator sensor 110 and a yaw rate $\phi_k$ detected by the gyro sensor 112 ($\theta_k^{vir}$=SLP $(0, v_k, V_k, \phi_k)$) The gradient offset observation value may be calculated, for example, through Equation 5. Here, $\psi_k$, $\theta_k^{vir}$ and $\theta_k^{gps}$ are the gradient offset observation value, the gradient in the virgin state and the gradient based on the positioning sensor, respectively. In addition, $C_{snr}$ is a characteristic constant of the positioning sensor, specifically, a sensor voltage-acceleration conversion constant, which varies according to the inclinometer 104. In the present disclosure, $C_{snr}$ is, for example, −62 m/s²/V. It may be g=$|\vec{g}|$=9.8 m/s².

$$\psi_k = \frac{g}{100} \cdot \frac{\theta_k^{vir} - \theta_k^{gps}}{C_{snr}} \qquad \text{[Equation 5]}$$

Next, the processor 138 may calculate gradient offset estimation data based on the gradient offset observation value and the related parameter (S225).

The gradient offset estimation data may be obtained by a predetermined estimation logic. For example, the estimation logic may be an estimator according to a recursive least squares (RLS), as shown in FIG. 4. In the recursive least squares, since the gradient offset estimation data is sequentially updated with a time k, the data may be simply estimated in real time. FIG. 4 is a view exemplifying an estimation logic according to a recursive least squares (RLS).

The estimation logic shown in FIG. 4 will be described. Estimation according to the recursive least squares may employ, as input parameters, at least newest gradient offset observation value $\psi_k$ calculated during driving of the moving object 100 and at least a past offset estimation covariance $P_{k-1}$ among offset estimation covariances based on the positioning sensor 106 calculated during driving. The newest gradient offset observation value may be calculated at a current point in time. In the estimation, gradient offset estimation data including the gradient offset estimation value $\vec{\psi}_k$ based on the positioning sensor 106 and the newest (or current) offset estimation covariance $P_k$ may be output based on the input parameters.

In addition, estimation according to the recursive least squares is performed when matching of the positioning sensor described in step S210 is satisfied ($d_k$==1), thereby calculating the gradient offset estimation data.

In addition, estimation according to the recursive least squares may be performed by adding a forgetting factor λ. The gradient offset observation value used for the estimation as the input parameter may be determined according to the value of the forgetting factor. Specifically, the observation value used as the input parameter may be selected as at least one of the current to past gradient offset observation values based on the value of the forgetting factor. When the forgetting factor λ is 0, only the current gradient offset observation value may be considered and, when the forgetting factor λ is 1, some or all the past gradient offset observation values may also be considered. The forgetting factor may be set according to the conditions of RLS estimation and, for example, the forgetting factor may be specified as 0.9999.

Figure 4:
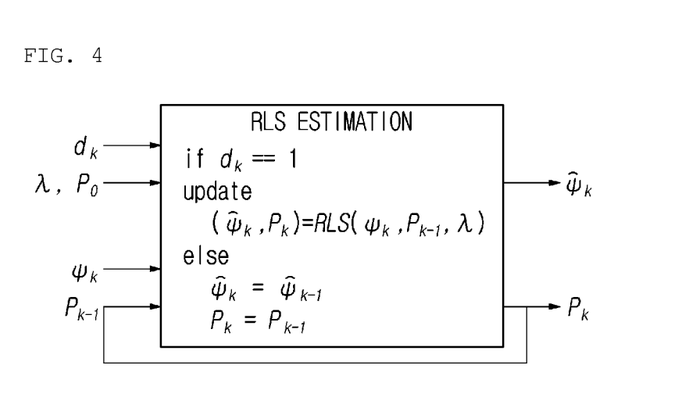
FIG. 4 is a view exemplifying an estimation logic according to a recursive least squares (RLS).

Meanwhile, $P_0$ in RLS estimation shown in FIG. 4 is an initial covariance, and may be a tuning parameter set according to the conditions of RLS estimation, the moving object 100 and the surrounding state. The initial covariance may be set to, for example, 0.1.

Referring to FIG. 2 again, the processor 138 may determine whether a current offset estimation covariance included in the gradient offset estimation data satisfies a convergence condition in the offset correction condition (S115).

Specifically, the convergence condition may be set such that the current offset estimation covariance $P_k$ is less than at least a convergence reference value, as shown in Equation 5. In Equation 6, $\lambda$ may be a forgetting factor. The offset estimation covariance $P_k$ may mean statistical reliability of the gradient offset estimation value $\hat{\psi}_k$ and may be experimentally determined. As another example, in the convergence condition, the current offset estimation covariance may be defined to be greater than or equal to a convergence reference value.

$$P_k < 3(1-\lambda) \qquad \text{[Equation 6]}$$

Upon determining that the offset estimation covariance does not satisfy the convergence condition, the processor 138 may discard the gradient offset estimation value related to the convergence condition and proceed to step S110 to calculate the gradient offset estimation data using the following information obtained from the positioning sensor 106.

Upon determining that the offset estimation covariance satisfies the convergence condition, the processor 138 may determine whether an offset error range, that is, gradient error, satisfies an offset error condition in the offset correction condition (S120).

The offset error condition may be set such that a gradient error between the inclinometer offset value stored in the non-volatile memory 118 and the gradient offset observation value exceeds at least a detection reference value a. The detection reference value a may be set to a value recognized as significantly causing error in the zero point information of the inclinometer due to a deviation between the offset value and the observation value.

The offset error condition may be, for example, defined as shown in Equation 7. Here, the stored inclinometer offset value and the gradient offset observation value are $\psi^*$ and $\psi_k$, respectively. g and $C_{snr}$ may be the average gravity and the characteristic constant of the positioning sensor, respectively. $C_{snr}$ may be a sensor voltage-acceleration conversion constant, which varies according to the inclinometer 104. The detection reference value a may be determined by the characteristic constant of the positioning sensor 106, and may be set to, for example, a value greater than or equal to 1%.

As another example, the offset error condition may be defined such that the gradient error is greater than or equal to the reference value a.

$$|\psi^* - \psi_k| > \left| \frac{g}{100} \cdot \frac{1}{C_{snr}} \right| \cong 0.016 \qquad \text{[Equation 7]}$$

Upon determining that the offset error condition is not satisfied, the processor 138 may use the inclinometer offset value stored in the non-volatile memory 118 as the offset value of the inclination sensor 104, and obtain the inclination angle from the inclination sensor 104.

Upon determining that the offset error condition is satisfied, the processor 138 may change the inclinometer offset value $\psi^*$ of the non-volatile memory 118 to the gradient offset observation value $\psi_k$, and correct the offset of the inclinometer 104 (S125).

Next, the processor 138 may calculate the gradient of the moving object 100 which is being driven through the inclination sensor 104, by applying the changed inclinometer offset value and the related parameter to the inclination sensor 104 (S130).

The gradient $\theta_k$ of the inclinometer 104 may be calculated based on the inclinometer offset value ($\psi^* = \psi_k$), the wheel based velocity ($v_k$), the measurement value $V_k$ measured by the accelerator sensor 110 and the yaw rate $\dot{\phi}_k$ detected by the gyro sensor 112 ($\theta_k = SLP(\psi^*, v_k, V_k, \dot{\phi}_k)$).

Next, the processor 138 may determine whether a holding time has elapsed after the start-up of the moving object is turned off by a passenger (S135). When the holding time has elapsed, the processor 138 may perform control to store the changed the inclinometer offset value $\psi^* = \psi_k$ in the non-volatile memory 118 (S140). When start-up is resumed without elapse of the holding time, the processor 138 may maintain and apply the existing inclinometer offset value before change to the inclination sensor 104, without storing the changed inclinometer offset value in the non-volatile memory 118.

According to the present disclosure, without mounting an additional module, using information obtained from the positioning sensor 106 provided in the moving object 100, zero point adjustment for the inclinometer 104 of the moving object 100 may be automatically performed. By automatic zero point adjustment, it is possible to prevent malfunction of the EHS implemented through the function provider 132 and error of weight estimation.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various implementations of the present disclosure are not a list of all possible combinations and are intended to describe representative aspects of the present disclosure, and the matters described in the various implementations may be applied independently or in combination of two or more.

In addition, various implementations of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various implementations to be executed on an apparatus or a computer, a non-transitory computer-readable medium having such software or commands stored thereon and executable on the apparatus or the computer.

What is claimed is:

1. A method of correcting a gradient offset of a moving object, the moving object including a positioning sensor and an inclinometer, the method comprising:

obtaining, using at least one computing device and based on the moving object being driven and further on a signal generated using the positioning sensor, moving object velocity data;

calculating, using the at least one computing device, a gradient offset observation value based on the moving object velocity data, wherein the gradient offset observation value is calculated based on a difference between (i) a gradient based on the positioning sensor and (ii) a gradient of the inclinometer calculated based on an inclinometer offset value being 0;

calculating, using the at least one computing device, gradient offset estimation data based on the gradient offset observation value, wherein the gradient offset estimation data is calculated by estimating the gradient offset estimation data using recursive least squares; and storing, using the at least one computing device and based on the gradient offset estimation data and the gradient offset observation value satisfying an offset correction condition, the gradient offset observation value as the inclinometer offset value in a memory device of the moving object, and controlling the moving object based on the inclinometer offset value stored in the memory device to thereby restrict malfunction.

2. The method of claim 1, further comprising:

determining a matching condition of the positioning sensor, before calculating the gradient offset observation value, wherein calculating the gradient offset observation value comprises calculating the gradient offset observation value based on the matching condition being satisfied.

3. The method of claim 2, wherein the matching condition is satisfied by satisfying an observation matching condition and a velocity matching condition, wherein the observation matching condition is set such that a number of satellites observable in relation to the positioning sensor is greater than a number of satellites used to determine the matching condition, and wherein the velocity matching condition is set such that a wheel based velocity of the moving object is greater than or equal to a matching velocity and that a relative error between the moving object velocity data and the wheel based velocity is less than or equal to a matching threshold.

4. The method of claim 1, wherein the gradient based on the positioning sensor is calculated based on the moving object velocity data, and wherein the moving object velocity data includes a magnitude of a velocity vector based on the positioning sensor and a vertical velocity in the velocity vector.

5. The method of claim 1, wherein the gradient of the inclinometer is calculated based on a wheel based velocity of the moving object, a measurement value of the inclinometer provided at the moving object, and a yaw rate of the moving object.

6. The method of claim 1, wherein estimating the gradient offset estimation data using the recursive least squares includes receiving, as input parameters, (i) a newest gradient offset observation value among gradient offset observation values calculated during driving and (ii) a past offset estimation covariance among offset estimation covariances based on the positioning sensor calculated during driving, and wherein the gradient offset estimation data includes a positioning sensor based gradient offset estimation value and a newest offset estimation covariance.

7. The method of claim 6, wherein estimating the gradient offset estimation data using the recursive least squares includes adding a forgetting factor, and wherein a gradient offset observation value used for estimating the gradient offset estimation data is determined among current to past gradient offset observation values according to a value of the forgetting factor.

8. The method of claim 6, further comprising:

determining a matching condition of the positioning sensor, before calculating the gradient offset observation value, wherein calculating the gradient offset observation value comprises calculating the gradient offset observation value based on the matching condition being satisfied, and wherein estimating the gradient offset estimation data using the recursive least squares includes calculating the gradient offset estimation data based on the matching condition of the positioning sensor being satisfied.

9. The method of claim 1, wherein the offset correction condition is set such that at least part of the gradient offset estimation data is less than or equal to a convergence reference value and that a gradient error between the stored inclinometer offset value and the gradient offset observation value is greater than or equal to a detection reference value, and wherein the at least part of the gradient offset estimation data is an positioning sensor based-offset estimation covariance during driving.

10. The method of claim 1, further comprising:

calculating, based on the moving object being driven, a gradient according to the inclinometer by applying the changed inclinometer offset value; and storing, based on a holding time being elapsed after start-up of the moving object is turned off, the changed inclinometer offset value in the memory device of the moving object.

11. A device for correcting a gradient offset of a moving object, the device comprising:

a positioning sensor;

an inclinometer;

at least one memory device storing an inclinometer offset value; and a processor, wherein the at least one memory device stores instructions that when executed by the processor cause the device to perform operations comprising:

obtaining, based on the moving object being driven and using the positioning sensor, moving object velocity data, calculating a gradient offset observation value based on the moving object velocity data, wherein the gradient offset observation value is calculated based on a difference between (i) a gradient based on the positioning sensor and (ii) a gradient of the inclinometer calculated based on an inclinometer offset value being 0, calculating gradient offset estimation data based on the gradient offset observation value, wherein the gradient offset estimation data is calculated by estimating the gradient offset estimation data using recursive least squares, storing, based on the gradient offset estimation data and the gradient offset observation value satisfying an offset correction condition, the gradient offset observation value as the inclinometer offset value in a memory device of the moving object, and controlling the moving object based on the inclinometer offset value stored in the memory device to thereby restrict malfunction.

12. The device of claim 11, wherein the operations comprises:

determining a matching condition of the positioning sensor, before calculating the gradient offset observation value, wherein calculating the gradient offset observation value comprises calculating the gradient offset observation value based on the matching condition being satisfied.

13. The device of claim 12, wherein the matching condition is satisfied by satisfying both an observation matching condition and a velocity matching condition, wherein the observation matching condition is set such that a number of satellites observable in relation to the positioning sensor is greater than a number of satellites used to determine the matching condition, and wherein the velocity matching condition is set such that a wheel based velocity of the moving object is greater than or equal to a matching velocity and a relative error between the moving object velocity data and the wheel based velocity is less than or equal to a matching threshold.

14. The device of claim 11, wherein the gradient based on the positioning sensor is calculated based on the moving object velocity data, and wherein the moving object velocity data includes a magnitude of a velocity vector based on the positioning sensor and a vertical velocity in the velocity vector.

15. The device of claim 11, wherein the gradient of the inclinometer is calculated based on a wheel based velocity of the moving object, a measurement value of the inclinometer provided at the moving object and a yaw rate of the moving object.

16. The device of claim 11, wherein estimating the gradient offset estimation data using the recursive least squares includes receiving, as input parameters, (i) a newest gradient offset observation value among gradient offset observation values calculated during driving and (ii) a past offset estimation covariance among offset estimation covariances based on the positioning sensor calculated during driving, and wherein the gradient offset estimation data includes a positioning sensor based gradient offset estimation value and a newest offset estimation covariance.

17. The device of claim 16, wherein estimating the gradient offset estimation data using the recursive least squares includes adding a forgetting factor, and wherein a gradient offset observation value used for the estimating the gradient offset estimation data is determined among current to past gradient offset observation values according to a value of the forgetting factor.

18. The device of claim 16, wherein the operations comprises:

determining a matching condition of the positioning sensor, before calculating the gradient offset observation value, wherein calculating the gradient offset observation value comprises calculating the gradient offset observation value based on the matching condition being satisfied, and wherein estimating the gradient offset estimation data using the recursive least squares includes calculating the gradient offset estimation data based on the matching condition of the positioning sensor being satisfied.

19. The device of claim 11, wherein the offset correction condition is set such that at least part of the gradient offset estimation data is less than or equal to a convergence reference value and that a gradient error between the stored inclinometer offset value and the gradient offset observation value is greater than or equal to a detection reference value, and wherein the at least part of the gradient offset estimation data is an positioning sensor based-offset estimation covariance during driving.

20. The device of claim 11, wherein the operations comprises:

calculating, based on the moving object being driven, a gradient according to the inclinometer by applying the changed inclinometer offset value; and storing, based on a holding time being elapsed after start-up of the moving object is turned off, the changed inclinometer offset value in the at least one memory device.

* * * * *